Dec. 15, 1925.

C. E. ZIEGLER

IRRIGATOR

Filed Feb. 27, 1925

WITNESSES
J. Herbert Bradley

INVENTOR
Charles E. Ziegler,
by Winter, Brown & Critchlow,
his attorneys.

Patented Dec. 15, 1925.

1,566,061

UNITED STATES PATENT OFFICE.

CHARLES E. ZIEGLER, OF PITTSBURGH, PENNSYLVANIA, ASSIGNOR OF ONE-HALF TO WILLIAM C. ARTHUR, OF PITTSBURGH, PENNSYLVANIA.

IRRIGATOR.

Application filed February 27, 1925. Serial No. 11,988.

*To all whom it may concern:*

Be it known that I, CHARLES E. ZIEGLER, a citizen of the United States, and a resident of Pittsburgh, in the county of Allegheny and State of Pennsylvania, have invented a new and useful Improvement in Irrigators, of which the following is a specification.

This invention relates to vaginal and recto-colon irrigators, and its general object is to so improve their construction that they may be more easily operated and will not rapidly wear out, and that their intended functions may be greatly enhanced and their fields of usefulness enlarged.

Specific objects are to provide irrigators having nozzles constructed to include cut-offs or valves for controlling flow of irrigating fluids, and having nozzles provided with means for sealing the entrances of organs into which the nozzles are inserted.

Figure 1:
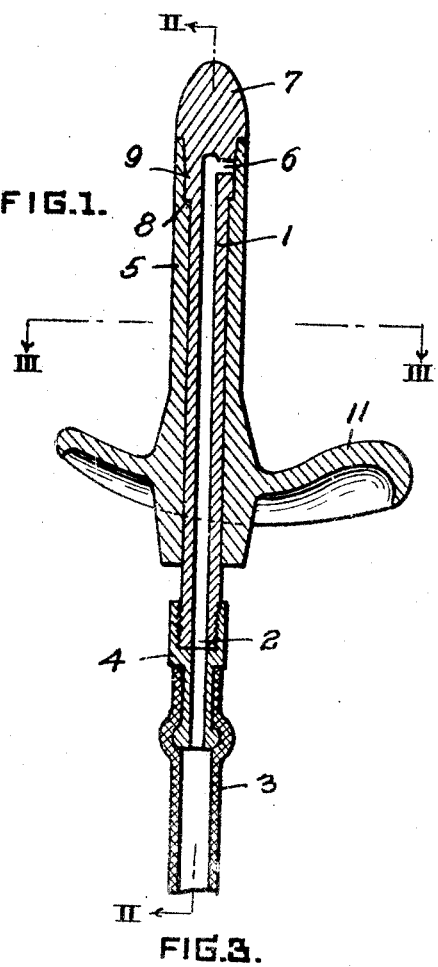
Figure 2:
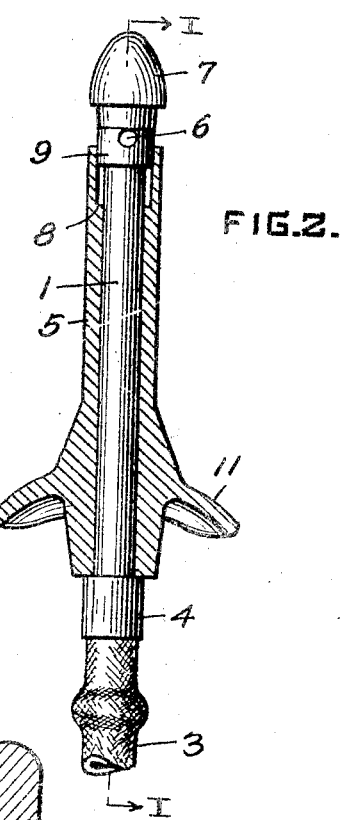
Figure 3:
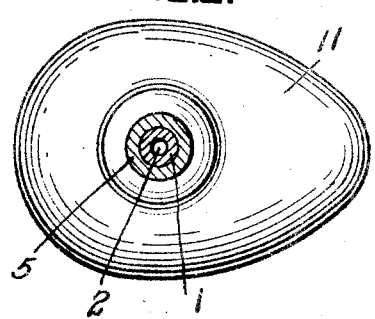

The invention is illustrated in the accompanying drawings, of which Fig. 1 is a longitudinal central sectional view of a recto-colon irrigator, the plane of view being indicated by the line I—I, Fig. 2; Fig. 2 a longitudinal central sectional view of the irrigator shown in Fig. 1, the plane of view being at right angles to that of Fig. 1, and indicated by the line II—II, Fig. 1; Fig. 3 a transverse sectional view taken on the line III—III, Fig. 1; and Fig. 4 a view corresponding to Fig. 1 of a vaginal irrigator.

Irrigating apparatus of the type here contemplated usually comprises a rubber or metal container of irrigating fluid, a rubber tube leading from its bottom, and a nozzle attached to the outer end of the rubber tube, the nozzle being variously constructed depending upon the particular purpose for which it is intended to be used. Flow through the nozzle is usually controlled by a spring clip attached to the rubber tube, which clip is inconvenient to operate because it is not at the places where the user holds the nozzle. Furthermore, the clip breaks the wall of the tube, particularly when the cut-off is allowed to remain in closed position for an extended period of time.

One feature of this invention concerns the provision of an irrigator nozzle having its outer end provided with an inlet opening and its inner end with an outlet opening, and being provided intermediate of these openings with a valve for controlling flow of irrigating fluid. In the illustrative embodiment of this feature of the invention the nozzle comprises an inner tubular stem 1 having an inlet 2 at its outer end, to which a rubber hose 3 leading from a container of irrigating fluid may be attached by a suitable coupling 4 which may be screw-threaded interiorly to engage external threads at the end of the stem. The stem, which has an outlet 6 at its inner end, is mounted within a sleeve 5 in such manner that it may be moved with relation to the sleeve to control flow through the nozzle. Preferably the stem is mounted for longitudinal movement within the sleeve, and preferably it is provided at its outer end with a valve head 7 which overhangs the inner end of sleeve 5 and seals such end when the stem is in the position indicated in Fig. 1. To effect an irrigating flow through the nozzle, the stem is moved inwardly to the position indicated in Fig. 2, which shows outlet 6 above the inner end of sleeve 5. To prevent the flow of irrigating fluid backwardly between stem 1 and sleeve 5, the outer end of the sleeve is preferably counter-bored or enlarged interiorly to form a seat 8 for the inner end of an enlargement 9 of the stem adjacent to its head 7. By so constructing the nozzle, flow through it may be easily controlled by merely moving stem 1 within sleeve 5, and this may conveniently be done by the hand of the user holding the nozzle.

A further feature of the invention has to do with the provision of means for sealing the entrances of organs into which irrigator nozzles are inserted. For this purpose the nozzle is provided with a laterally extending shield which is preferably shaped to conform to the contour of the anatomy at the entrance of an organ.

For recto-colon irrigators such as shown in Figs. 1, 2 and 3, there may be attached to sleeve 5 a shield 11 of the general contour indicated in the drawings, the shape being that of the anatomy at the anal opening. In use this shield effectively closes the anus against leakage or premature expulsion of irrigating fluid.

In addition to cleansing the bowel in the manner described, the recto-colon irrigator also provides adequate means for applying heat through the rectum to inflamed pelvic organs in the female, and to the seminal vesicles and prostate gland in the male, the rectum in each instance being filled with hot water which may be retained by the shield, and the operation being repeated by an additional supply of hot water as often as may be necessary. Furthermore, the provision of a shield for closing the anal opening is of material advantage in giving nutritive enemata to be retained, and in the administration of drugs through the rectum when the stomach is not retentive.

Figure 4:
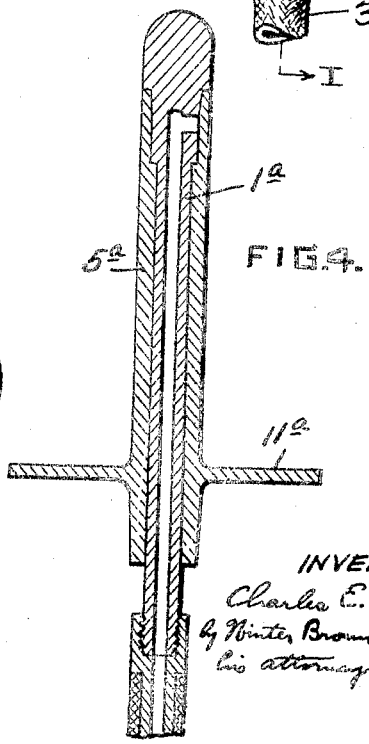

In Fig. 4 of the drawings there is shown a nozzle for a vaginal irrigator comprising an inner stem 1ª and a sleeve 5ª, these elements being constructed to form a cut-off or valve the same as illustrated in Figs. 1 and 2. For sealing the vaginal entrance a shield 11ª is attached to and projects laterally from sleeve 5ª, the shield preferably being in the form of a circular disk. The shield seals the vaginal entrance against leakage or premature expulsions of an irrigating fluid and until the vaginal walls become separated and all folds or crevices distended. In other words, the shield retains irrigating fluid in the vagina so that the fluid becomes effective to expand the vaginal walls and bring the antiseptic content of the fluid into full contact with infected areas long enough to affect the microorganisms in the intended manner. Also, in cases where the application of heat to inflamed parts through the vagina is desirable, the vagina may be filled with hot water and the water retained in contact with the parts so long as desired.

According to the provisions of the patent statute I have explained the principle and operation of my invention, and have specifically described and illustrated what I now consider to represent its best embodiments. However, I desire to have it understood that, within the scope of the appended claims, the invention may be practiced by other forms of construction than those particularly illustrated and described.

I claim as my invention:

1. An irrigator for the purposes described, comprising a nozzle formed of a sleeve closed throughout its longitudinal extent and open at its ends, and a tubular stem mounted for longitudinal movement with relation to said sleeve and provided at its outer end with an inlet opening and having its side walls provided with an outlet port, the inner end of said stem being closed and being provided beyond said outlet port with an offset valve head cooperating with the inner end of said sleeve to control flow of irrigating fluid through the nozzle.

2. An irrigator for the purposes described, comprising a nozzle formed of a sleeve open at its ends, and a tubular stem mounted for longitudinal movement with relation to said sleeve and provided at its outer end with an inlet opening and having its side wall provided with an outlet port, the inner end of said stem being closed and being provided with a valve head cooperating with the inner end of said sleeve to control flow of irrigating fluid through the nozzle, and the interior of said sleeve and the exterior of said stem being provided with cooperating shoulders to prevent the rearward flow of irrigating fluid when said valve head closes the outer end of the sleeve.

3. An irrigator for the purposes described, comprising a nozzle formed of a sleeve closed throughout its longitudinal extent and open at its ends, and a tubular stem mounted for longitudinal movement with relation to said sleeve and provided at its outer end with an inlet opening and having its side wall provided with an outlet port, the inner end of said stem being closed and being provided beyond said outlet port with an offset valve head cooperating with the inner end of said sleeve to control flow of irrigating fluid through the nozzle, and the outer end of the sleeve being provided with a laterally extending shield formed integrally with the sleeve.

In testimony whereof, I sign my name.

CHARLES E. ZIEGLER.